(12) United States Patent  (10) Patent No.: US 9,345,356 B2
Vreys et al.  (45) Date of Patent: May 24, 2016

(54) FLOOR MAT

(75) Inventors: Mark Vreys, Oostakker (BE); Berend J. G. Hoek, Terneuzen (NL)

(73) Assignee: Trinseo Europe GmbH, Horgen (CH)

(*) Notice: Subject to any disclaimer, the term of this patent is extended or adjusted under 35 U.S.C. 154(b) by 85 days.

(21) Appl. No.: 14/234,694

(22) PCT Filed: Jul. 29, 2011

(86) PCT No.: PCT/EP2011/063103
§ 371 (c)(1),
(2), (4) Date: Jun. 4, 2014

(87) PCT Pub. No.: WO2013/017147
PCT Pub. Date: Feb. 7, 2013

(65) Prior Publication Data
US 2014/0322490 A1 Oct. 30, 2014

(51) Int. Cl.
*A47G 27/02* (2006.01)
*B60N 3/04* (2006.01)

(52) U.S. Cl.
CPC ............ *A47G 27/0206* (2013.01); *B60N 3/046* (2013.01); *Y10T 428/24479* (2015.01)

(58) Field of Classification Search
CPC ............................ A47G 27/0206; B60N 3/046
USPC .................................................... 428/99, 120
See application file for complete search history.

(56) References Cited

U.S. PATENT DOCUMENTS

| 5,316,817 A * | 5/1994 | Timperley ........................ 428/78 |
| 5,667,873 A | 9/1997 | Beckenbach |
| 6,475,593 B1 | 11/2002 | Hattori et al. |
| 2005/0035633 A1 | 2/2005 | Robbins |
| 2007/0275209 A1* | 11/2007 | Netravali et al. ................ 428/99 |

FOREIGN PATENT DOCUMENTS

| CN | 2284021 | 6/1998 |
| FR | 2772321 | 6/1999 |

OTHER PUBLICATIONS

International Search Report, PCT/EP2011/063103, filed Jul. 29, 2011, search completed May 10, 2012.
International Preliminary Report on Patentability, PCT/EP2011/063103, filed Jul. 29, 2011, report issued Feb. 4, 2014.

* cited by examiner

*Primary Examiner* — Alexander Thomas
(74) *Attorney, Agent, or Firm* — Brinks Gilson & Lione

(57) ABSTRACT

A floor mat includes a plurality of projections integrally formed and extending from a lower surface. At least some of the projections have a straight axis and a cross section perpendicular to the straight axis that decreases from the base to the tip of the projection. The at least some projections have a height measured along the axis and a width corresponding to its largest dimension measured parallel to a plane of the lower surface such that the ratio of the width to the height of the projection is greater than 1.

17 Claims, 5 Drawing Sheets

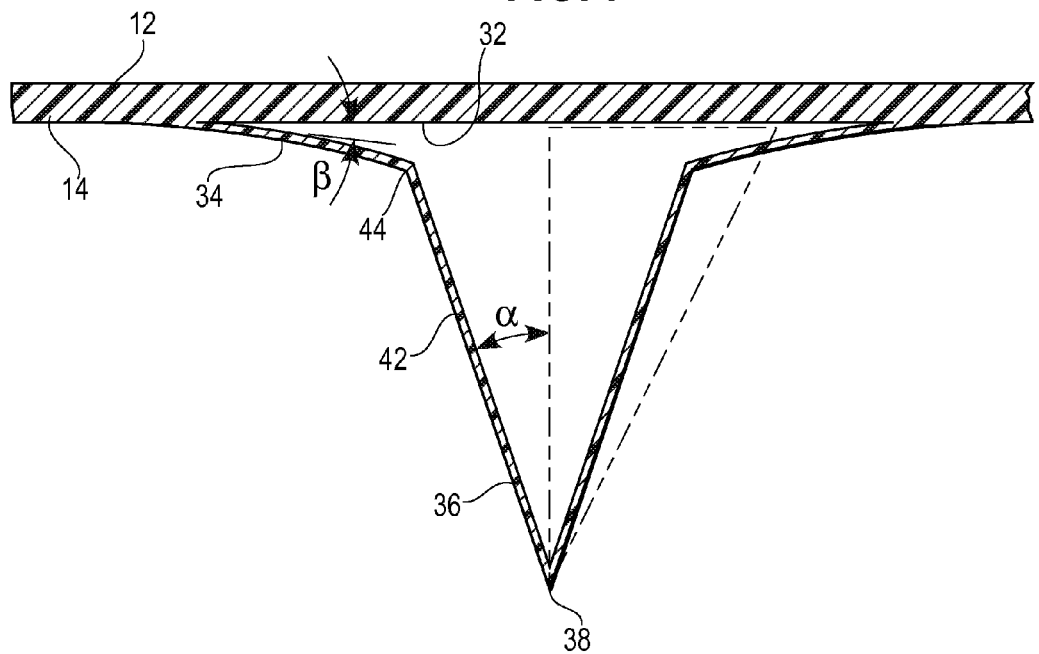
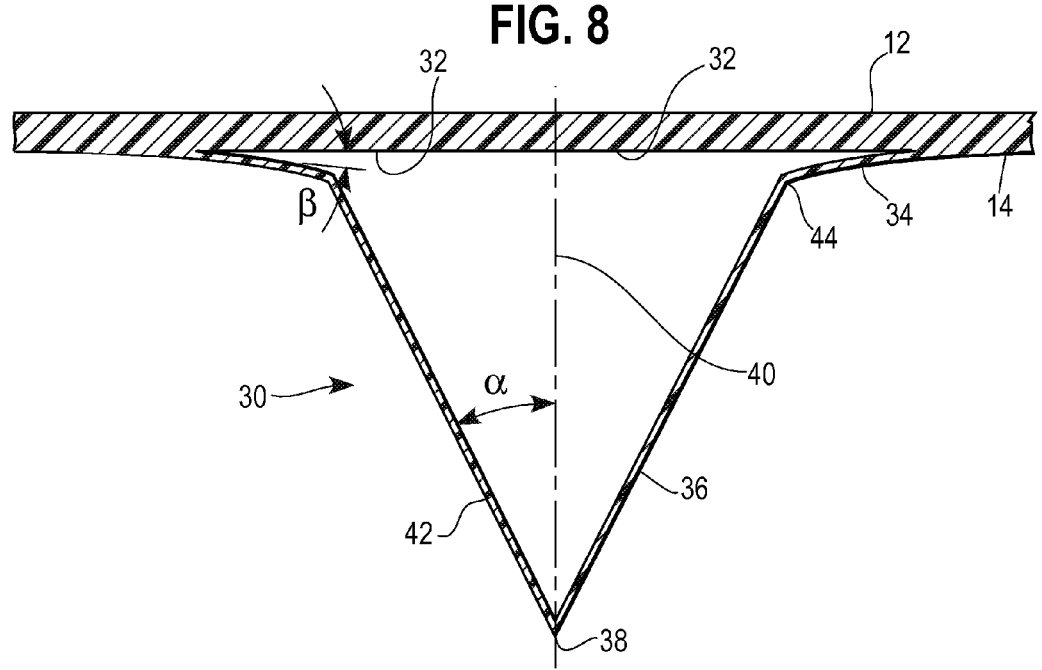

FLOOR MAT

This application is a National Stage application of International Application No. PCT/EP2011/063103 filed Jul. 29, 2011, the entire contents of which are hereby incorporated herein by reference.

This invention relates to a floor mat that is useful in the home, office or any other situation where protection of an underlying carpet or rug is desired. It may, for example, be used as an automobile floor mat or as a chair mat beneath a desk chair.

BACKGROUND OF THE INVENTION

Desk chair mats for office and home use are known. Typically, a chair mat has a main portion on which the desk chair rolls, and can include a forward lip portion that is adapted to extend partially into a desk well, and on which the feet of the person sitting in the chair can rest. A desk chair mat that is to be applied over carpeting is typically formed of a semi-rigid plastic and has an array of spikes on an underside to hold the mat firmly in place on the carpeting.

Floor mats, however, exhibit cracking over time as a result of fatigue load caused by the forces of the chair and other objects on the upper surface. The fatigue load generates craze initiation over time, particularly near the base of the spikes, which eventually leads to cracking of the mat. As a result, the aesthetic appearance and function of the mat is reduced leading to eventual replacement.

SUMMARY

The present invention provides a mat intended to be provided between a flat surface such as an upper surface of a carpet or rug and a fatigue load such as the lower surface of a chair. The mat has a substantially planar upper surface (smooth or embossed) suitable for interacting with a chair support such as a plurality of wheels. The mat has a perimeter that defines an outer edge of the mat and a lower surface parallel to the upper surface. The lower surface includes a plurality of solid projections that extend from the lower surface to engage the flat surface such as the carpet or rug. At least some of the projections have a straight axis and a cross section perpendicular to the straight axis that extends from the base of the projection to its tip. The projections or at least some of the projections have a height measured along the straight axis and a width corresponding to its largest dimension measured parallel to a plane of the lower surface such that the ratio of the width to the height is greater than 1.

It has been found that by providing projections with the above configuration that stress concentrations near the base of the projection can be significantly reduced. Advantageously, for the same fatigue load, the life of the mat is increased as compared to known designs.

BRIEF DESCRIPTION OF THE DRAWINGS

FIGS. 4-7 show enlarged cross-sectional views of alternative embodiments of a projection with the prior art design from FIG. 2 being superimposed.

FIG. 8 shows an enlarged cross-sectional view of another embodiment of a projection according to the present invention.

DETAILED DESCRIPTION OF THE EMBODIMENTS

Figure 1:
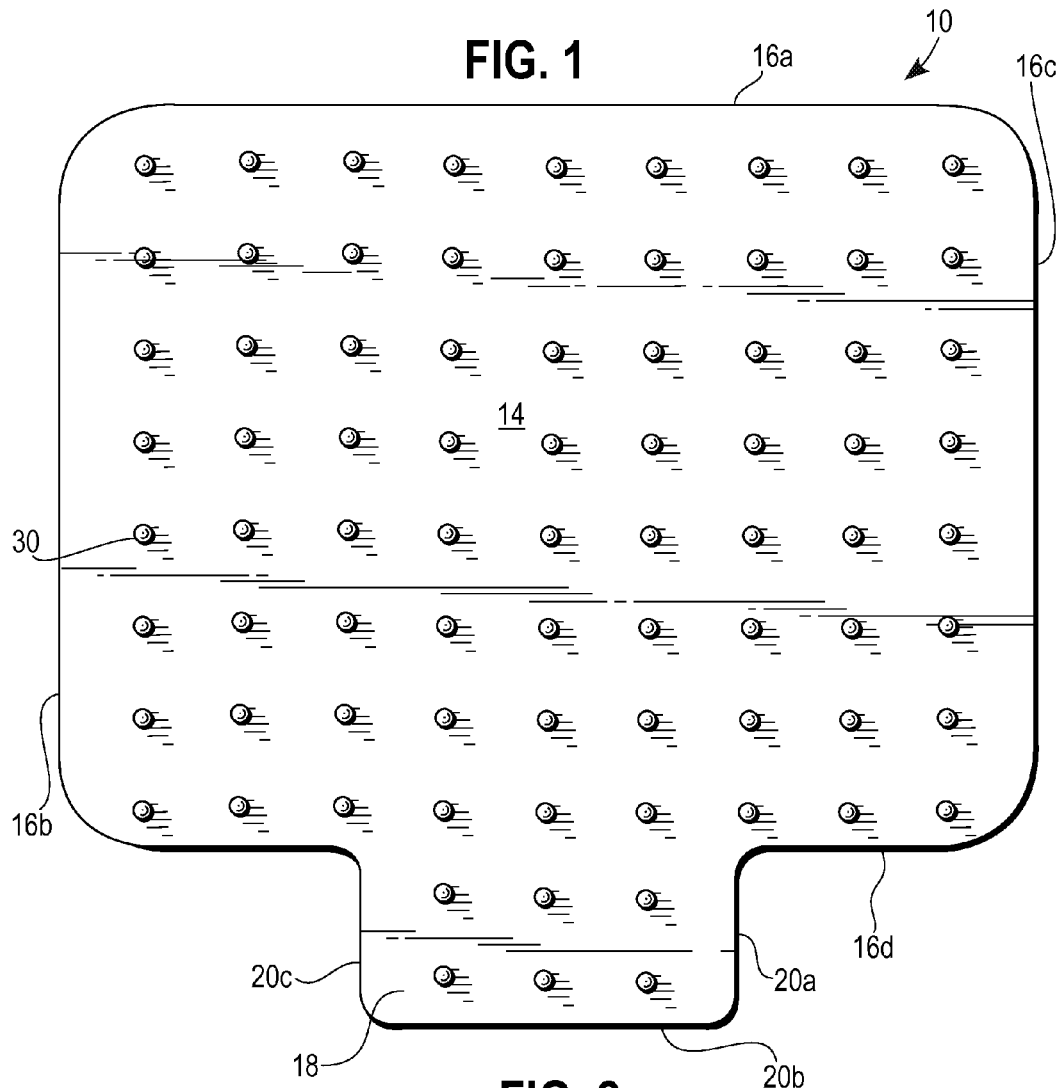
FIG. 1 is a perspective view of the lower surface of a mat having a plurality of solid projections according to the present invention.

Referring now to FIG. 1, a mat 10 according to the present invention is shown. The mat 10 is made of a plastic polymer such as acrylic, polypropylene, polyvinylchloride or polycarbonate styrene elastomer having a Rockwell hardness of at least 115 as measured by ASTM D785-08. The mat 10 is formed in any suitable manner such as by extruding the mat 10 as a single piece. The mat 10 can have any suitable thickness; however, it generally has a planar thickness between about 0.5 mm to about 2.0 mm and in some cases from about 0.8 mm to about 1.2 mm.

The mat 10 is generally planar and has an upper surface 12 and a lower surface 14. The mat typically has four side edges 16a, 16b, 16c, and 16d but is not limited to one with four edges. The mat may, for example, have one edge as in a circle or oval, three edges as in a triangle, four edges as in a quadrilateral and so on. The mat may even have an irregular shape that encompasses a particular design. If required, an optional extension portion 18 of the same material and thickness may project or extend from the mat as shown in FIG. 1 and as further defined by edges 20a, 20b, and 20c to define a periphery of the mat.

The upper surface 12 is generally smooth to interact with a chair or similar furniture piece, although it may be embossed, slightly embossed or textured. The lower surface 14 has a plurality of solid projections 30 that extend from the lower surface 14 to contact a flat surface such as a carpet or rug (not shown).

The projections 30 are generally disposed on substantially the entire area of the lower surface 14 of the mat 10 at a rate of between about 8 projections per 10 square centimeters to about 25 projections per 10 square centimeters. In some embodiments, the number of projections is from about 10 to about 20 projections per 10 square centimeters and may be about 16 projections per 10 square centimeters.

The projections 30 can be arranged in a variety of patterns. For example, the projections 30 can be aligned in parallel rows or columns. Alternatively, the projections 30 can be arrayed in a staggered fashion. Generally, the distance between adjacent projections 30 is between about 10 mm to about 40 mm. If the spacing is dramatically smaller than this, the mat 10 can tend to ride on top of the carpet rather than nestle into the pile as desired. If the spacing is dramatically larger than this, and the size of the individual projections 30 remains substantially unchanged, there may not be sufficient stability of the mat 10 relative to the carpet to prevent creep, which is generally not desirable.

Figure 2:
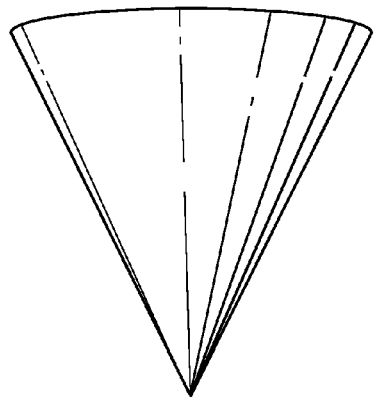
FIG. 2 shows a prior art design of a projection having a conical shape and with a width equal to its height.

Turning now to FIG. 2, a prior art projection is shown. It can be appreciated that the prior art projection has a generally conical shape with a base being substantially equal to the height of the projection. As described above, it has been found that fatigue causes cracking in the area where the edge of the base of the projection intersects the lower surface of the mat.

Figure 3:
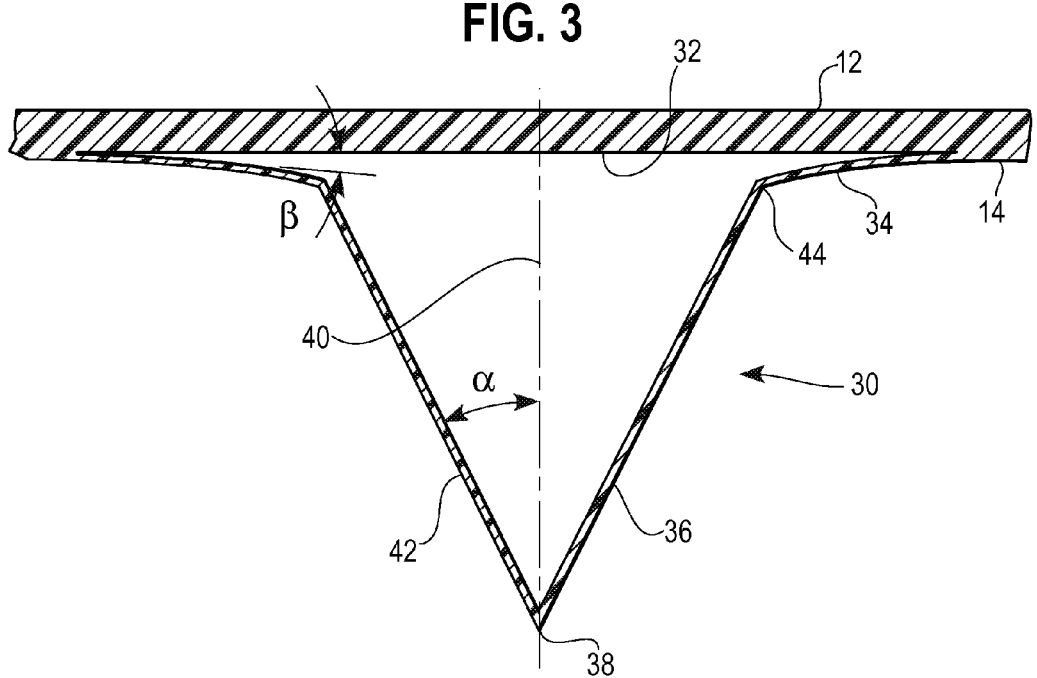
FIG. 3 shows an enlarged cross-sectional view of one embodiment of a projection according to the present invention.

FIG. 3 shows one embodiment of a solid projection 30 according to the present invention. The projection is solid but the central section has been left clear for clarity. The projection 30 has a base 32 formed integrally with the lower surface 14 of the mat 10. Base 32 and lower surface 14 lie in the same plane perpendicular to axis 40. Height is measured along a straight axis 40 extending from the tip 38 to the base 32 (i.e. to the plane containing lower surface 14) of the projection 30. The tip 38 enters the carpet or rug to engage the carpet.

Figure 4:
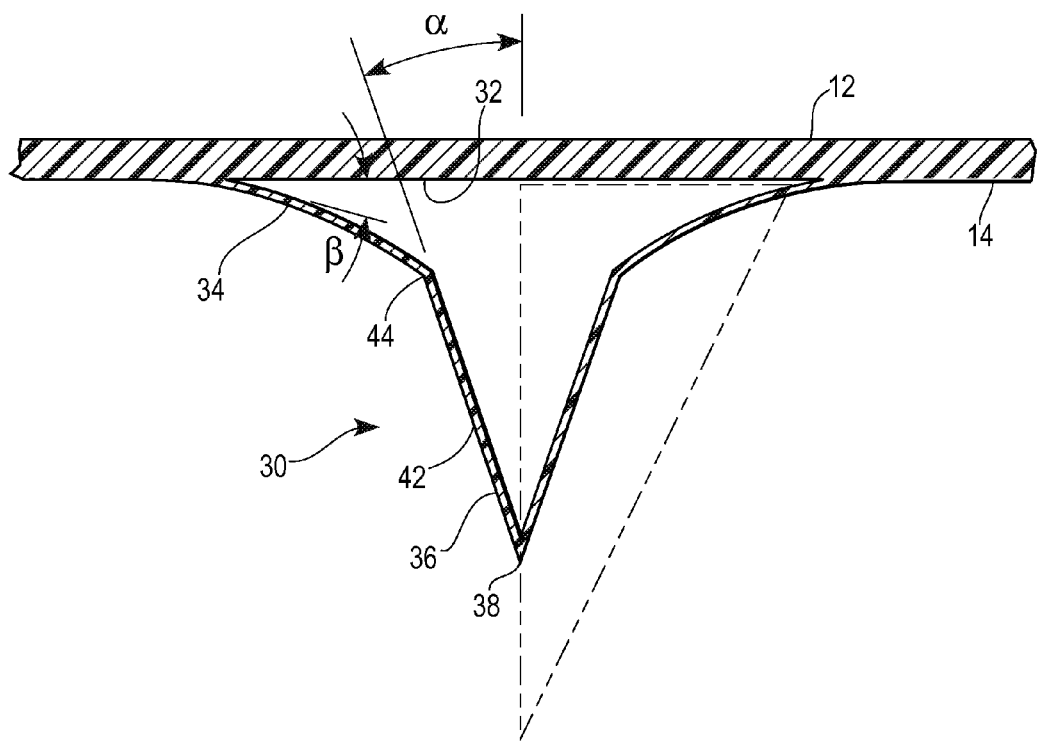
Figure 5:
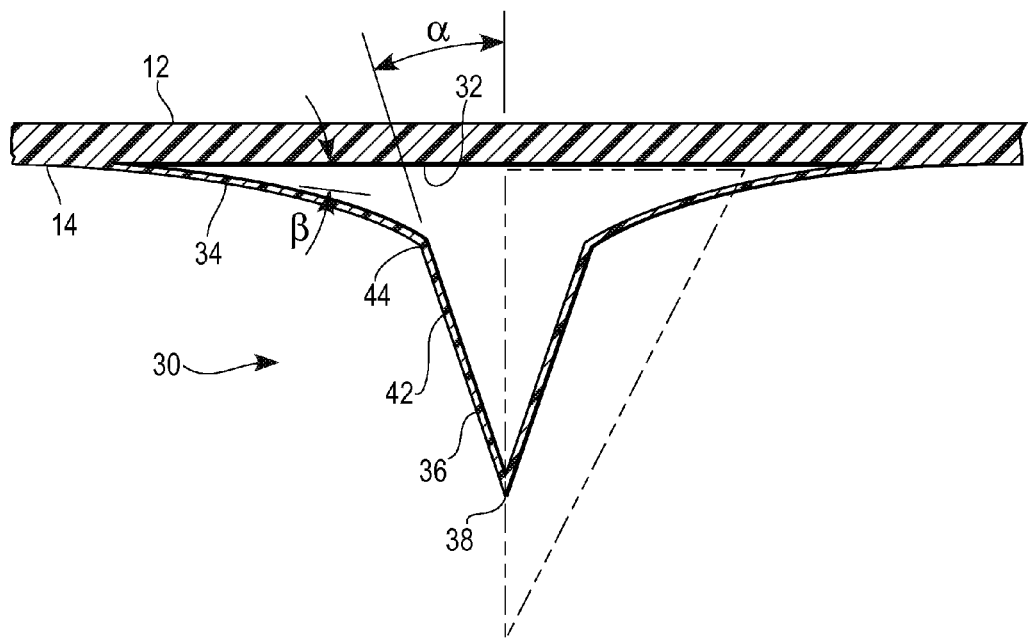

The base 32 has a width of its longest dimension from about 3 mm to about 15 mm, in certain embodiments from about 5 mm to about 11 mm and in other embodiments from about 7 mm to about 9 mm. Width is measured from the point where the lower section of the projection 34 departs from the lower surface 14. In FIG. 4, for example, these points are marked as "w". In the embodiments shown in FIGS. 3-9, the projections 30 have a circular base and therefore, the term width refers to the diameter of the base. It is contemplated, however, that the base of the projection 30 may have any suitable shape, although it is desirably circular.

The solid projection 30 has an outer surface 42 defined by a lower section 34 that extends from the lower surface 14 of the mat 10 and is joined to an upper section 36 that terminates in a tip 38. In one embodiment, the lower section 34 and the upper section 36 are coextensive and concave. In other embodiments the lower section 34 of the projection 30 is joined to the upper section 36 of the projection 30 through a curved radius 44.

The base 32 is integral with the lower surface 14 of the mat 10 and from which the lower section 34 of the projection 30 extends from the lower surface 14 of the mat 10. The outer surface of lower section 34 extends from the lower surface 14 of the mat 10 at an angle β ranging from about 1° to about 45°, in some cases from about 10° to about 35° and in other cases from about 15° to about 30°. The angle is measured from the outer surface as the projection is solid.

As noted above, the upper section 36 of the projection 30 terminates in a tip 38. The tip 38 may be pointed, radiused, or may have some other suitable shape. In one embodiment, the upper section 36 of the projection 30 is conical and has a conicity defined by the angle α between the straight axis 40 (that extends from the tip 38 of the projection 30 to the lower surface 14 of the mat 30) and the outer surface 42 of the projection 30 ranging from about 5° to about 60°, in some cases from about 15° to about 50°, and in other cases from about 25° to about 45°.

The distance from the tip 38 to the base of the projection 32, i.e. to lower surface 14 of the mat 10, is defined as the height of the projection 30. The height of the projection 30 is generally from about 1 mm to about 25 mm, in some cases from about 3 mm to about 15 mm, and in other cases from about 5 mm to about 10 mm. Advantageously, it has been found that the resistance to fatigue is increased if the ratio of the width of the projection 30 (measured as the longest dimension of the base 32 between points "w") to its height is greater than 1. In some embodiments the ratio of the width of the projection 30 to its height is less than about 5. In other embodiments, the ratio of the width of the projection 30 to its height is in the range from about 1.2 to about 4 and in other embodiments from about 1.5 to about 3.

In accordance with the present invention, the volume of the projection 30 is less than the volume of a cone having a ratio of the width to the height of 1. Preferably the volume is from about 20% to about 80%, more preferably from about 30% to about 70% or even more preferably from about 40% to about 60% of a cone having a ratio of the width to the height of 1.

EXAMPLES

Sample rectangular floor mats having a planar thickness of 1.2 mm and having 3 projections were made by injection molding using the polycarbonate Caliber® 503-5. The rectangular sample was cut into three equal size strips with each strip having a projection in the center of the strip. The strips were then subjected to a fatigue test described below.

The end edge of each strip is positioned on two cylindrical supports to simulate a three point bend test. The strip is position such that the projection is centered between the two supports and points downward. A cylindrical indenter that is connected to a load cell pushes the top of the sample mat at a rate of 2 Hz exactly above the projection (i.e., exactly at the location of the projection). The indenter travels 15 mm downwards and then returns to its start position. The load cell continuously measures the force to deflect the strip and by means of a data acquisition system, the force is plotted as a curve against the number of travel cycles of the indenter. When the curve shows a discontinuous drop, the strip broke. The counts for the three strips were averaged to provide a fatigue number for each tested projection.

Figure 6:
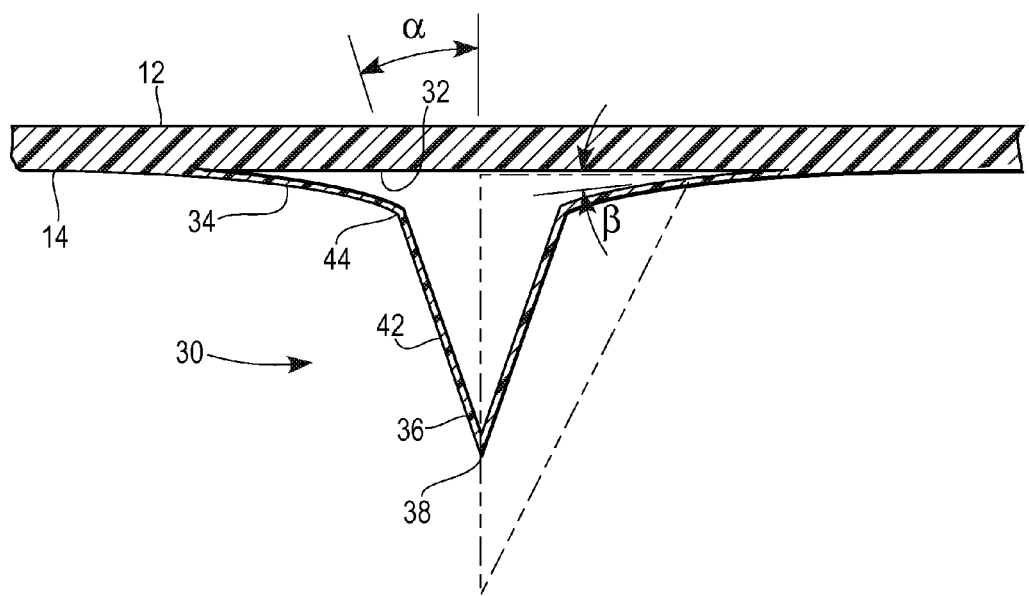
Figure 9:
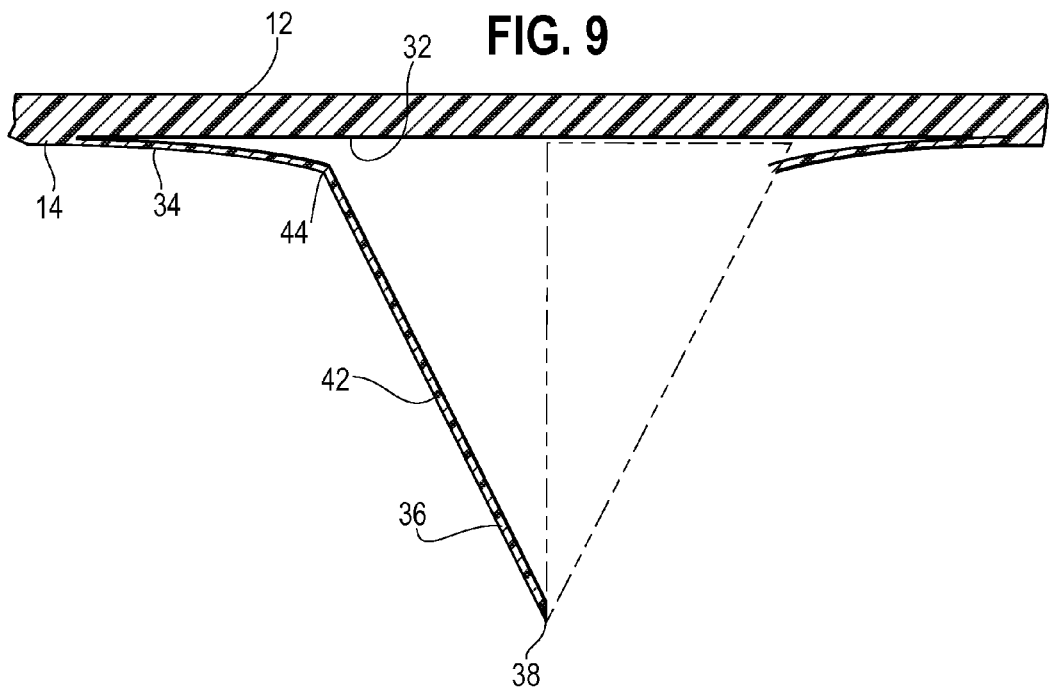
FIG. 9 shows an enlarged cross-sectional view of the projection of FIG. 3 with a portion of the right hand side (from the viewer's perspective) being moved to better illustrate the superimposed prior art projection of FIG. 2.
Figure 10:
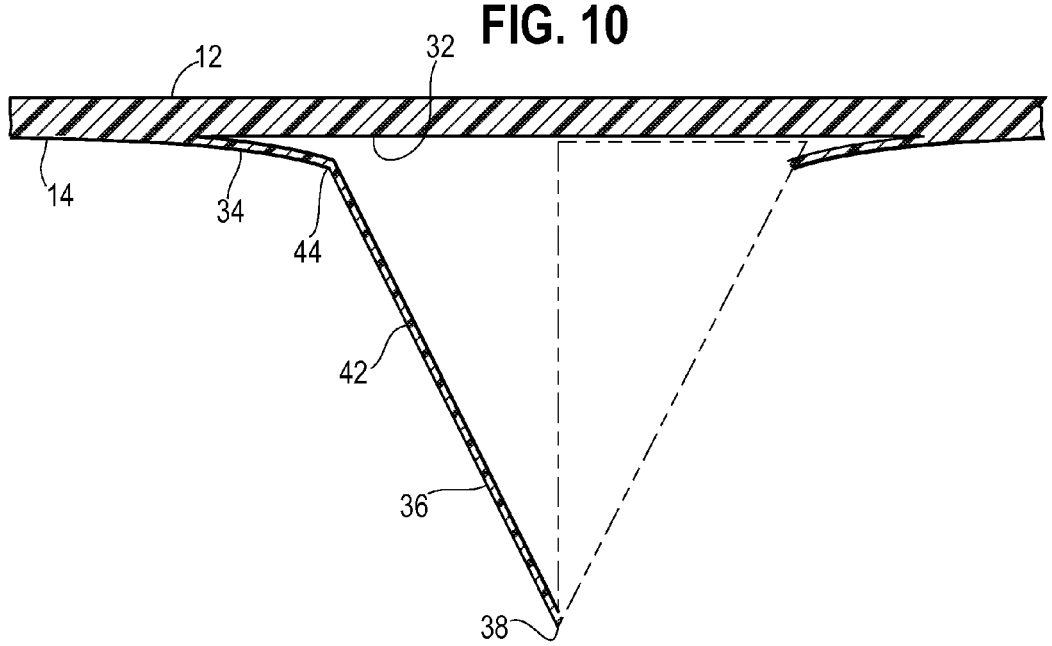
FIG. 10 shows an enlarged cross-sectional view of the projection of FIG. 8 with a portion of the right hand side (from the viewer's perspective) being moved to better illustrate the superimposed prior art projection of FIG. 2.

Sample floor mat made with projections shown in FIG. 2 and with projections shown in FIGS. 3, 6, and 8 were made and tested according to the procedure described above.

Table 1 shows the number of cycles before the sample experienced fatigue cracking. It can be seen that the projections according to the present invention provide a mat having an increased fatigue resistance as compared to the prior art projection.

TABLE 1

| Projection (Figure) | Cycles until fatigue |
| --- | --- |
| 2 | 92,500 |
| 3 | 108,700 |
| 6 | 94,000 |
| 8 | 156,900 |

The floor mat according to the present invention is not limited to a floor mat, but may also be used as a mat to be disposed on various carpets or rugs, or the like. For example, it may be disposed or fixed on the floor of a house, office, hallway, or any other building where heavy traffic or fatigue load is experienced. It may be used to protect carpets and rugs where furniture and other heavy objects are being moved around. It may also be used in automobiles.

Preferred Embodiments

A mat for providing non-skid support upon a flat surface comprising an upper surface, a lower surface parallel to the upper surface, and a plurality of projections extending from the lower surface to engage the flat surface, at least some projections having a straight axis and a cross section perpendicular to the straight axis that decreases from a base to a tip of the projection, wherein the at least some projections have a height measured along the axis and a width corresponding to its largest dimension measured parallel to a plane of the lower surface such that the ratio of the width to the height is greater than 1.

The mat wherein the at least some projections represent at least 40%, preferably at least 50%, more preferably at 60%, more preferably at least 70%, more preferably at least 80%, more preferably at least 90%, or at least 95% of the total projections on the mat.

The mat wherein the tip of the at least some projections is conical.

The mat wherein the at least some projections include a lower section and an upper section where the upper section terminates in a tip and has a conicity defined by the angle between the axis and an outer surface of the upper section from about 5° to about 60°.

The mat wherein the lower section extends from the lower surface of the mat to the upper section at an angle from about 1° to about 45°.

The mat wherein the lower section adjoins the upper section in a rounded section.

The mat wherein the at least some projections have an outer surface a portion of which is concave.

The mat of any one of paragraphs wherein the ratio of the width to the height is less than about 5.

The mat wherein the at least some projections have a height between about 1 mm and about 25 mm.

The mat wherein the at least some projections have a width of between about 3 mm and about 15 mm, between about 5 mm and about 11 mm or between about 7 mm and about 9 mm.

The mat wherein the mat is extruded as a single piece.

The mat being formed of polycarbonate.

The mat wherein the polycarbonate has a Rockwell hardness of at least 115 as measured by ASTM D785-08.

The mat wherein all the projections are substantially identical.

The mat wherein the volume of the at least some projections is from about 20% to about 80%, preferably from about 30% to about 70% and more preferably from about 40% to about 60% of the volume of a cone having a ratio of the width to the height of 1.

The mat having 1, 3, 4, 5, 6, 7, 8, 9 or 10 sides.

The mat wherein the at least some projections are disposed at a rate of about 8 to about 25 projections, preferably about 10 to about 20 projections, or about 16 projections per 10 square centimeters.

The mat wherein the spacing between adjacent projections is about 10 to 40 mm, preferably between 20 to 30 mm. Spacing is measured between the tips of the projections.

The invention claimed is:

1. A mat for providing non-skid support upon a flat surface comprising an upper surface, a lower surface parallel to the upper surface, and a plurality of projections extending from the lower surface to engage the flat surface, at least some of the plurality of projections having a straight axis and a cross section perpendicular to the straight axis that decreases from a base to a tip of the projection, wherein the at least some of the plurality of projections have a height measured along the axis and a width corresponding to its largest dimension measured parallel to a plane of the lower surface such that the ratio of the width to the height is greater than 1 and less than about 5, wherein the at least some of the plurality of projections include a lower section and an upper section where the upper section terminates in a tip and has a conicity defined by the angle between the axis and an outer surface of the upper section from about 5° to about 60 degrees, and wherein the lower section extends from the lower surface of the mat to the upper section at an angle from about 1° to about 45 degrees.

2. The mat of claim 1, wherein the tip of the at least some of the plurality of projections is conical.

3. The mat of claim 1, wherein the lower section adjoins the upper section in a rounded section.

4. The mat of claim 1, wherein the at least some of the plurality of projections have an outer surface a portion of which is concave.

5. The mat of claim 1, wherein the at least some of the plurality of projections have a height between about 1 mm and about 25 mm.

6. The mat of claim 5, wherein the at least some of the plurality of projections have a width is between about 3 mm and about 15 mm.

7. The mat of claim 1, wherein the mat is extruded as a single piece.

8. The mat of claim 1, wherein the mat is formed of poly carbonate.

9. The mat of claim 8, wherein the polycarbonate has a Rockwell hardness of at least 115 as measured by ASTM D785-08.

10. The mat of claim 1 wherein all the projections are substantially identical.

11. The mat of claim 1 wherein the volume of the at least some of the plurality of projections is from about 20% to about 80% of the volume of a cone having a ratio of the width to the height of 1.

12. The mat of claim 1, wherein the at least some of the plurality of projections include a lower section and an upper section where the upper section terminates in a tip and has a conicity defined by the angle between the axis and an outer surface of the upper section from about 15° to about 50°.

13. The mat of claim 1, wherein the at least some of the plurality of projections include a lower section and an upper section where the upper section terminates in a tip and has a conicity defined by the angle between the axis and an outer surface of the upper section from about 25° to about 45°.

14. The mat of claim 1, wherein the at least some of the plurality of projections comprise at least 40% of the total projections of the mat.

15. The mat of claim 1, wherein the at least some of the plurality of projections are disposed at a rate of about 8 to about 25 projections per 10 square centimeters.

16. The mat of claim 1, wherein the at least some of the plurality of projections are disposed at a rate of about 10 to about 20 projections per 10 square centimeters.

17. The mat of claim 1, wherein the ratio of the width of the projection to its height is in the range from about 1.2 to about 4.

* * * * *